Patented May 25, 1943

2,319,951

UNITED STATES PATENT OFFICE 2,319,951

THERMOPLASTIC LIGNOCELLULOSIC PRODUCT AND METHOD OF MAKING THE SAME

Arlie W. Schorger, Madison, Wis., assignor to Burgess Cellulose Company, Freeport, Ill., a corporation of Delaware No Drawing. Application January 24, 1940, Serial No. 315,381

12 Claims. (Cl. 260—10)

This invention relates to an improved method of making a thermoplastic lignocellulosic material capable of being molded under heat and pressure into hard, resinous products by heat-treating natural lignocellulosic material. The invention provides an improvement in the heat-treating method whereby a product having improved molding plasticity, strength and water-resistance is obtained. The invention also relates to the product produced by the method.

In general, the invention relates to the type of heat treatment in which the natural lignocellulose is subjected to heating in the presence of water whereby a portion of the lignocellulose, believed to be mainly the hemicelluloses, is rendered water-soluble while the lignin is left in situ and the lignocellulose is rendered thermoplastic and capable of being hot-molded into hard, water-resistant, resinous products.

It is an object of the invention to provide an improvement in the heating method which results in increased plasticity during molding and increased strength and water-resistance in the molded product. Briefly, the improvement which characterizes the invention is obtained by cooking the natural lignocellulose in the presence of a small quantity of water and a phenolic substance.

In general, the method of producing resinous products from natural lignocellulosic materials comprises heat-treating, or cooking, a subdivided natural lignocellulose, such as wood, corncobs, straw, bagasse, cornstalks, etc., in the form of chips, sawdust, etc., with water at an elevated temperature to render water-soluble the hemicelluloses and possibly other constituents. When a natural lignocellulosic material is referred to herein, the term includes manufactured products such as newsprint containing, for example 70% to 90% of coniferous ground wood. The ground wood in this material is substantially in its original or natural condition. The residual products, after extraction of the water-solubles by water washing, and subsequent drying, contain a large part of the original thermoplastic, resinous lignin and fibrous cellulose intrinsically unchanged. The lignin, furthermore, is retained in its natural location upon the cellulose fibers. The dried product, if not already sufficiently finely divided, is reduced to a powder which will pass through a 40-mesh, or finer, screen and is capable of being hot-molded under pressure into hard, resinous products without the employment of an added binder. These general features of the method are not new with this invention, the improvement of this invention residing in the employment of a small quantity of water, a phenolic substance and an alkaline substance mixed with the lignocellulose during the heating operation.

Various methods have been suggested for preparing a plastic by heating a lignocellulose or a carbohydrate with a phenolic substance, such as phenol or cresol. In these methods, a large excess of the phenol is used, or an excess of water, or a mineral acid is added to serve as a catalyst. Such acid causes carbonization of the carbohydrates so that the plastic possesses little strength. Furthermore, the acid must be removed, and such removal is difficult, and any traces remaining cause etching of the mold. In other methods, alkaline substances have been used as catalysts, but these attempts also have met with little success.

In accordance with the present invention, the discovery has been made that when a natural lignocellulose is heat-treated with small amounts of water and a phenol, a product is obtained which has excellent plastic flow, and good strength and water-resistance. Whereas in previous methods the amount of water has been equal to or more than the weight of the natural lignocellulose, in accordance with the present method, the amount of water is preferably less than the weight of the lignocellulose, namely from 15% to 50%, based on the dry weight of the natural lignocellulose, which has been oven dried at 105° C. When proportions are given throughout the description and claims, it is understood that these proportions are based on said oven dried weight of the natural lignocellulose. The permissible range of water content under the invention is from oven dry to approximately 100%.

The amount of phenol which is mixed with the natural lignocellulose is approximately 1% to 50%, preferably 5% to 25%. For this purpose any of the phenols may be used, and it is understood that this includes substances which, under the conditions of the cooking operation, are capable of reacting to form a phenol. "Tar acids" comprising crude phenols, may be used. During the cooking operation, the phenol combines chemically with the lignocellulose, the reaction being in the nature of a condensation. The low concentrations of water and phenol employed provide high efficiency in the fixation of the phenol. The phenol reacts with the lignin of the lignocellulosic material to impart improved properties. During heating in the presence of the water, a portion of the carbohydrates contained in the lignocellulose is decomposed, and it is believed that the phenol reacts with these carbohydrate decomposition products, as well as with the lignin, to form products which improve the properties of the molding composition.

The heat plasticity and strength of the resulting plastic are improved materially by having a small amount of an acid-neutralizing substance present during the cooking step. During the cooking operation, organic acids, such as acetic and formic acids, are liberated from the lignocellulose, and it is desirable to employ an alkaline reagent to neutralize these acids as they are formed. The use of alkaline reagents in water cooking a natural lignocellulose is disclosed in my joint co-pending application Serial No. 219,596, filed July 16, 1938, now Patent 2,247,204, granted June 24, 1941. For best results in producing a well-flowed product having high strength and water-resistance, the pH at the end of the cooking operation should be between 4.0 and 6.0. If the strength of the molded product is the primary consideration and the water-resistance is not so important, the pH at the end of the cooking operation may be 6.0, but in any case, it should preferably be kept below 7.0. The alkaline material serves only to neutralize the acids formed, and is not sufficient in amount to serve also as a catalyst for the reaction between the phenol and the lignocellulose.

Sodium hydroxide is the preferred alkaline material, but others may be used, such as sodium carbonate, potassium hydroxide, potassium carbonate, calcium hydroxide and sodium sulphite. Approximately 1% to 7% of sodium hydroxide is suitable, the quantity used in the individual case depending upon the kind of lignocellulose and the properties desired in the plastic product, as discussed heretofore. If a different alkaline reagent is used, an amount is employed which has an acid-neutralizing power equivalent to the mentioned 1% to 7% of sodium hydroxide.

The acid-neutralizing function may be secured without employing a separate alkaline reagent, by using a salt of phenol which contains an acid-neutralizing radical. Such compound supplies the acid-neutralizing agent and the phenol as well. An example is sodium phenate. The salt alone, or a mixture of the salt and a phenol, may be used. The term "acid-neutralizing agent" as used in the specification and claims includes such an alkaline reacting radical.

The lignocellulosic material is comminuted prior to the cooking operation. Alternatively, it may be in the form of chips, and may be cooked with steam or water at an elevated temperature and simultaneously subjected to a disintegrating action by carrying out the cooking in a disintegrator such as a ball mill. The raw material may be impregnated with the acid-neutralizing agent and the phenol prior to the cooking operation. If it is in the form of chips, the impregnation may be carried out with or without disintegration.

The cooking operation may be carried out at temperatures from approximately 150° C. to 250° C. In the same way, the cooking time may be varied, from approximately 5 minutes to 3 hours. The conditions may be varied in accordance with the particular lignocellulosic material which is being treated and other factors, such as economy, etc. As a general matter, cooking for a short time at a high temperature is equivalent to cooking for a longer period at a lower temperature. The preferred cooking conditions are 185° C. to 210° C. and 15 to 60 minutes. During the heating operation, an exothermic reaction takes place, and cooling means should be employed if necessary to prevent excessively high temperatures. After the cooking operation, the composition is washed with water to remove the water-solubles and dried. If it is not sufficiently finely divided, it is reduced to a powder suitable for hot-molding.

In order to show the beneficial effects of the invention, tables are given hereinafter setting forth the results of cooking the natural lignocellulosic material under predetermined different conditions. The kind of wood, phenol and alkaline reagent and the time and temperature of cooking, and the conditions of washing and drying the cooked product were maintained the same, while the amounts of water, phenol and sodium hydroxide present during the cooking operation were varied. Ash wood previously ground to a powder, was cooked at a temperature of 205° C. for a period of one hour, and the cooked composition was washed with water and dried at a temperature of 105° C. This dried material was then subjected to molding heat and pressure.

For determining plasticity, a mold 4 inches long and 2 inches wide was employed and the dried powder was maintained in the mold at a temperature of 180° C. and a pressure of 1000 pounds per square inch for a period of 10 minutes. For determining the strength and water-resistance, circular discs 2 inches in diameter were molded at 185° C. and 5000 pounds per square inch for 10 minutes. The percent flow given in Table I represents the percent of the total surface area of the molded product which has the uniform black color indicating complete flow. M. R. represents the modulus of rupture, in pounds per square inch, of the molded product, and W. A. represents the water absorption, in percent of the weight of the molded product, undergone by the molded product after having been submerged in water at room temperature (20° C.) for 24 hours. Table I shows the results of cooking in the absence of a phenol, with different amounts of sodium hydroxide. In these tests, the water content was maintained the same, at 15%.

TABLE I.—*No phenol; 15% water; varying sodium hydroxide*

| No. | Per cent NaOH | Per cent flow | M. R. | W. A. |
|---|---|---|---|---|
| 1 | 0 | .0 | 3626 | 9.3 |
| 2 | 1 | 0 | 5921 | 2.21 |
| 3 | 2 | 10 | 7125 | 2.36 |
| 4 | 3 | 30 | 6723 | 2.48 |
| 5 | 4 | 55 | 6250 | 2.93 |
| 6 | 5 | 19 | 7260 | 3.04 |
| 7 | 6 | 34 | 7306 | 3.57 |
| 8 | 7 | 0 | 7075 | 8.00 |

Table II shows the results obtained when 5% of cresol is present during cooking. The amount of water was maintained at 15%, and the amount of sodium hydroxide was varied in the different tests.

TABLE II.—*5% cresol; 15% water; varying sodium hydroxide*

| No. | Per cent NaOH | Per cent flow | M. R. | W. A. |
|---|---|---|---|---|
| 9 | 0 | 0 | 4674 | 1.76 |
| 10 | 1 | 63 | 6881 | 1.05 |
| 11 | 2 | 85 | 7006 | 1.59 |
| 12 | 3 | 88 | 7963 | 2.91 |
| 13 | 4 | 100 | 7424 | 2.71 |
| 14 | 5 | 100 | 6798 | 3.00 |
| 15 | 6 | | 7705 | 3.50 |
| 16 | 7 | 90 | 7597 | 4.00 |
| 17 | 8 | 51 | 8971 | 5.80 |
| 18 | 9 | | 10172 | 9.30 |

A comparison of Table I and Table II shows the marked improvement in properties obtained by the use of cresol. Flow and water-resistance are both improved, and higher water-resistance is obtained at the lower concentrations of sodium hydroxide. In other words, under corresponding conditions the presence of cresol produces a pronounced increase in flow and decrease in water absorption, representing a favorable modification of these important properties.

Table III shows the results obtained when the amount of the phenols is increased.

TABLE III.—*10% cresol; 15% water; 1% sodium hydroxide*

| No. | Per cent NaOH | Per cent flow | M. R. | W. A. |
|---|---|---|---|---|
| 19 | 1 | 100 | 6083 | 2.01 |

Table III shows that an appreciable increase in molding plasticity is caused by an increase in the cresol content from 5% to 10%. Item No. 19 of Table III should be compared with item No. 10 of Table II. Item No. 19 has substantially increased flow.

Table No. IV shows the results obtained when the amount of water in the cook is varied. The amount of phenol and sodium hydroxide were maintained the same, as indicated.

TABLE IV.—*5% cresol; 1% sodium hydroxide; varying water content*

| No. | Per cent water | M. R. | W. A. |
|---|---|---|---|
| 20 | 6.6 | 6521 | 1.29 |
| 21 | 15 | 7056 | 1.51 |
| 22 | 25 | 7197 | 1.83 |
| 23 | 50 | 6315 | 4.2 |
| 24 | 100 | 6480 | 7.6 |

There is a marked decrease in the water-resistance of the molded product as the water content is increased beyond 50%.

As is shown by the tables and the foregoing discussion, the use of small amounts of water, relatively small amounts of a phenol and an alkaline reagent produces pronounced improvement in the properties of plastic flow, strength and water-resistance. In addition, the use of a small amount of water causes the concentration of the alkaline reagent and the phenol to be relatively high. There is, as a result, high efficiency in the utilization of these substances. Also, the employment of the combination of the three substances, water, a phenol and an alkaline reagent introduces great flexibility with respect to the properties which it is possible to obtain in the final product. By proper adjustment of the proportions of each, the desired balance between plastic flow, strength and water-resistance may be obtained for any particular application. In addition, the bulk density of the molding composition of this invention, in powder form, is greater than that of molding powders obtained heretofore by cooking a natural lignocellulose.

For molding, a plasticizer, such as water, aniline, furfural, or a phenol may be added to the dried molding powder. However, the use of a plasticizer is of less importance with the material of this invention, because one of its outstanding properties is high flow. When cooked under suitable conditions, the dry product molds readily and completely at temperatures between 145° C. and 180° C. under the pressures commonly used in commercial molding. Prior to molding the material may be mixed with a suitable lubricant for promoting release of the molded product from the mold. Oils, waxes and stearates, such as zinc stearate, are suitable lubricants. There may also be mixed with the material prior to molding, artificial resins and plastics, or natural resins.

It has also been found that sugars, such as glucose, sucrose, xylose, arabinose, etc., may be added to the mixture being cooked with beneficial results.

The following are specific examples of the method of the invention. It is understood that these are given by way of illustration and that the invention is not limited to these examples.

*Example I*

To 100 parts of oven dried ash wood powder are added, by weight, 15 parts of water, 7.5 parts of phenol, and one part of sodium hydroxide. The mixture is heated in a rotating digester by indirect steam at a temperature of 190° C. for 1.5 hours. The material is then washed with water, dried in an oven at 105° C., mixed with 1% zinc stearate and molded at a temperature of 185° C. and at a pressure of 5000 pounds to the square inch. The modulus of rupture of the product is 7840 pounds and the water absorption 1.72%.

*Example II*

To 100 parts of dry ash wood are added 15 parts of water, 5 parts of phenol, and one part of sodium hydroxide. The mixture is heated as in Example I at a temperature of 200° C. for one hour. The subsequent procedure is the same as in Example I. The molded product has a modulus of rupture of 5960 pounds and a water absorption of 1.92%.

*Example III*

To 100 parts of dry ash wood are added 15 parts of water, 5 parts of cresol, and 5 parts of sodium hydroxide. The mixture is heated for one hour at 205° C. The subsequent procedure is the same as in Example I. The modulus of rupture is 7010 pounds and the water absorption 2.79 percent.

*Example IV*

100 parts of dry ash wood, 100 parts of water, 5 parts of cresol, and one part of sodium hydroxide are mixed together and heated at 200° C. for one hour. The procedure is the same as in Example I. The modulus of rupture is 5665 pounds and the water absorption 7.1 percent.

The molded product of the present invention is a lustrous, black, hard, homogeneous, apparently structureless mass indistinguishable by the eye from the common synthetic resins. When the conditions which are stated heretofore to be preferred are followed in carrying out the method, the molded product has a specific gravity greater than 1.35, usually between 1.42 and 1.45, and has a water absorption not greater than 5% of its weight when immersed in water at room temperature (20° C.) for 24 hours.

I claim:

1. The method of forming a thermoplastic lignocellulosic composition capable of being molded under heat and pressure into hard, resinous products, which comprises heating at a temperature of 150° C. to 250° C. for approximately 5 minutes to 3 hours a mixture of subdivided natural lignocellulose, up to 100% of water, 1% to 50% of a phenol, and an acid-neutralizing substance possessing acid-neutralizing power equivalent to approximately 1% to 7% of sodium hydroxide to render water-soluble the hemicelluloses of said natural lignocellulose, and water-washing and drying the heated mixture.

2. The method of claim 1 in which the acid-neutralizing substance is sodium hydroxide.

3. The method of claim 1 in which the phenol is cresol.

4. The method of claim 1 in which the phenol is phenol.

5. The method of forming a thermoplastic lignocellulosic composition capable of being molded under heat and pressure into hard, resinous products, which comprises heating at a temperature of approximately 150° C. to 250° C. for up to approximately 3 hours a mixture of a subdivided natural lignocellulose, approximately 15% to 50% of water, 5% to 25% of a phenol, and an acid-neutralizing substance possessing acid-neutralizing power equivalent to approximately 1% to 7% of sodium hydroxide to render water-soluble the hemicelluloses of said natural lignocellulose, and water-washing and drying the heated mixture.

6. In the method of forming a thermoplastic lignocellulosic composition capable of being molded under heat and pressure into hard, resinous products by cooking a subdivided natural lignocellulose at an elevated temperature in the presence of an acid-neutralizing agent to render water-soluble the hemicelluloses of said natural lignocellulose, and water washing and drying the cooked lignocellulose, the improvement which comprises having present in admixture with said lignocellulose during the heating operation approximately 15% to 50% of water and 5% to 25% of a phenol.

7. In the method of forming a thermoplastic lignocellulosic composition capable of being hot-molded into hard, resinous products by cooking a subdivided natural lignocellulose in the presence of an acid-neutralizing agent to render water-soluble the hemicelluloses of said natural lignocellulose, and water-washing and drying the cooked lignocellulose, the improvement which comprises having present in admixture with said lignocellulose during the cooking operation up to approximately 100% of water and 1% to 50% of a phenol.

8. In the method of forming a thermoplastic lignocellulosic composition capable of being molded under heat and pressure into hard, resinous products by water cooking a subdivided natural lignocellulose in the presence of an acid-neutralizing agent and a phenol at an elevated temperature to render water-soluble the hemicelluloses of said natural lignocellulose, and water-washing and drying the cooked lignocellulose, the improvement which comprises limiting the said water and phenol present during the cooking operation to up to approximately 50% of water and from 5% to 25% of a phenol.

9. The method of making a dense, black thermoplastic, resinous product which comprises heating at a temperature of 150° C. to 250° C. for approximately 5 minutes to 3 hours a mixture of a subdivided natural lignocellulose, up to approximately 100% of water, 1% to 50% of a phenol, and an alkaline substance possessing acid-neutralizing power equivalent to approximately 1% to 7% of sodium hydroxide to render water-soluble the hemicelluloses of said natural lignocellulose, water-washing and drying the heated mixture, and subjecting the dried heated mixture to heat and pressure sufficient for molding.

10. A comminuted material which is plastic during hot-molding operations comprising a compound of lignocellulose and a phenol, said natural compound being the product of cooking a subdivided natural lignocellulose at a temperature of approximately 150° C. to 250° C. for approximately 5 minutes to 3 hours in the presence of an acid-neutralizing agent, up to approximately 100% of water and 1% to 50% of a phenol, and water-washing said cooked material.

11. A dense, black thermoplastic resinous product having a specific gravity of at least 1.35 and water absorption not greater than 8% when immersed in water at 20° C. for 24 hours, comprising a composition of lignocellulose and a phenol, said phenol being chemically combined with said lignocellulose, said composition being the product of cooking at a temperature of approximately 150° C. to 250° C. for approximately 5 minutes to 3 hours a mixture of a subdivided natural lignocellulose, up to approximately 100% of water, approximately 1% to 50% of a phenol and an acid-neutralizing substance equivalent to approximately 1% to 7% of caustic soda to render water-soluble the hemicelluloses of said natural lignocellulose, water-washing, drying and molding the cooked mixture.

12. A dense, black, thermoplastic resinous product having a specific gravity of at least 1.35 and a water absorption not greater than 5% when immersed in water at 20° C. for 24 hours, said product being the product of cooking at a temperature of approximately 150° C. to 250° C. for approximately 5 minutes to 3 hours a mixture of a subdivided natural lignocellulose, 5% to 25% of a phenol, approximately 15% to 50% of water and an acid-neutralizing agent to render water-soluble the hemicelluloses of said natural lignocellulose, and water-washing and molding the heated mixture.

ARLIE W. SCHORGER.

CERTIFICATE OF CORRECTION.

Patent No. 2,319,951.  May 25, 1943.

ARLIE W. SCHORGER.

It is hereby certified that error appears in the printed specification of the above numbered patent requiring correction as follows: Page 4, second column, line 17, claim 10, strike out the word "natural"; and that the said Letters Patent should be read with this correction therein that the same may conform to the record of the case in the Patent Office.

Signed and sealed this 13th day of July, A. D. 1943.

(Seal)

Henry Van Arsdale,
Acting Commissioner of Patents.